UNITED STATES PATENT OFFICE.

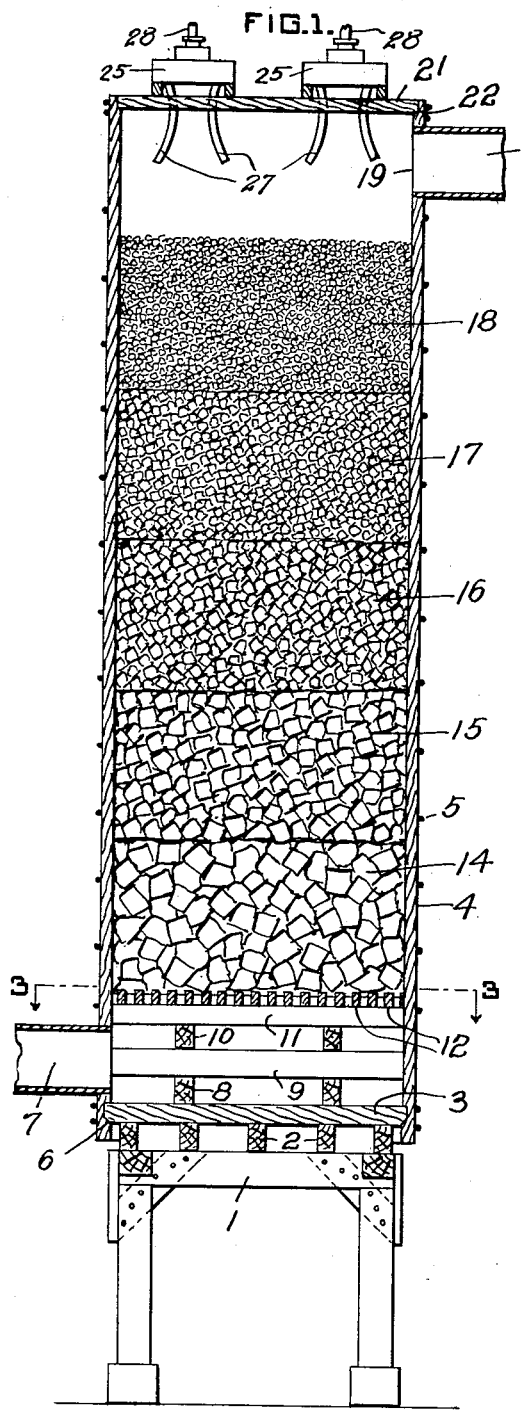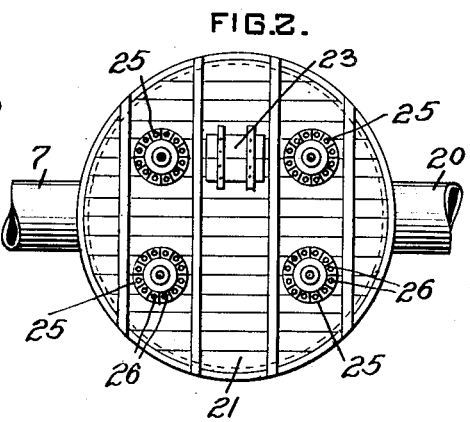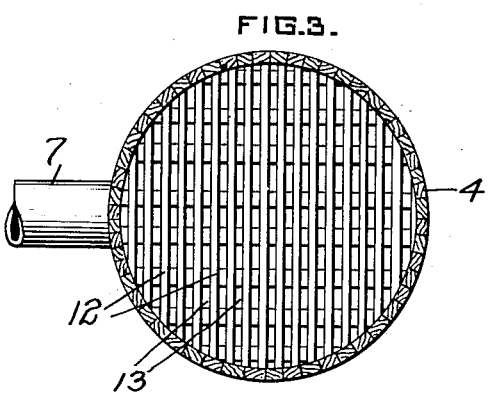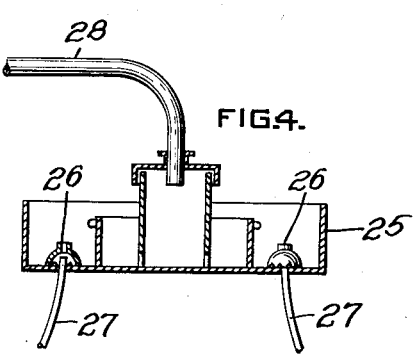

KARL F. STAHL, OF PITTSBURGH, PENNSYLVANIA, ASSIGNOR TO GENERAL CHEMICAL CO., OF NEW YORK, N. Y., A CORPORATION OF NEW YORK.

CONDENSER OR ABSORBER FOR HYDROFLUOSILICIC-ACID GAS.

1,367,993.   Specification of Letters Patent.   Patented Feb. 8, 1921.

Application filed August 18, 1917. Serial No. 187,019.

*To all whom it may concern:*

Be it known that I, KARL F. STAHL, a resident of Pittsburgh, in the county of Allegheny and State of Pennsylvania, have invented a new and useful Improvement in Condensers or Absorbers for Hydrofluosilicic-Acid Gas, of which the following is a specification.

This invention relates to a condenser or absorber for hydro-fluosilicic acid.

In the manufacture of sodium silico fluorid as a by-product from the manufacture of acid phosphate from phosphate rock, the treatment of the phosphate rock with sulfuric acid produces silicon fluorid which is decomposed by water in the form of sprays into hydro-fluosilicic acid and silicic acid, the latter being suspended in the gases in the form of small flakes. The silicic acid flakes are separated from the gases and most of the hydro-fluosilicic acid is absorbed by the water sprayed into the gases. It is necessary to absorb the remaining part of the hydro-fluosilicic acid, which is mixed with a large quantity of air, in water for the further treatment in the manufacture of the sodium silico fluorid and to avoid the escape of any obnoxious gas into the atmosphere. Such condensation or absorption of the gas is usually done in vertical chambers or towers which are generally empty or contain baffles or cross pieces of wood and through which the gas flows from the bottom upwardly, while water is sprayed in or trickled over the pieces of wood. Hydro-fluosilicic acid is a very energetic reagent and destroys the walls of the chamber or tower and also the wood filling contained therein. Furthermore, empty towers or those with baffles or cross pieces of wood are very inefficient, requiring a large space and much water to condense the gases, and the resulting hydro-fluosilicic acid is too weak to be used for the manufacture of sodium silico fluorid.

The object of the present invention is to provide a tower for condensing hydro-fluosilicic acid which is not subject to the foregoing objections. Generally stated, it consists in constructing the tower entirely of wood so treated as not to be easily attacked or affected by the acid, and using in said tower broken up or granulated charcoal, which is not affected by the gas, but remains in a firm condition, so as to always maintain the necessary interstices therethrough for the free flow of gas. Charcoal is preferable to coke, because it is more porous and less affected by hydro-fluosilicic acid, while the mineral matter in coke is gradually dissolved by this acid and becomes mushy.

In the accompanying drawing, Figure 1 is a sectional elevation through a tower or condenser constructed according to my invention; Fig. 2 is a plan view of the same; Fig. 3 is a horizontal section on the line 3—3, Fig. 1; and Fig. 4 is an enlarged sectional view through one of the water distributers.

The tank or chamber is supported upon any suitable base, such as the skeleton or trestle structure shown generally at 1, and which has a number of horizontal beams 2 upon which the bottom 3 of the tank is directly built. The entire tank construction is of wood, as metal is very readily attacked by the hydro-fluosilicic acid. The side walls 4 are preferably formed of staves or vertical strips bound together by hoops or bands 5 and preferably having the edges of the bottom 3 set into the same, as shown at 6. The gas inlet is through a suitable pipe 7 connected to an opening through the side wall near the bottom. Upon the bottom 3 of the tank are placed several series of cross beams marked 8, 9, and 10, respectively, to the height of the top of the inlet opening 7, and upon the last series of the beams 10 are placed a series of smaller cross beams 11 upon which the bottom proper is placed. This comprises a series of wooden strips 12 spaced apart by suitable spacing pieces 13, as shown in Fig. 3, thus forming an open grate like bottom. Upon this is placed the charcoal, in layers of various degrees of coarseness. First comes a rather thick layer 14, say three or four feet, of very coarse or large charcoal, and then comes a layer 15 of charcoal of smaller size, and this is followed by layers 16, 17 and 18 of charcoal of still smaller size, the tower or tank being filled up fairly close to its top with the charcoal. The gas outlet is through an opening 19 through the side walls near the top of the tower, from which a suitable pipe 20 can lead to the bottom of another similar tower, and so on until the gas has been practically all absorbed, or if one tower is sufficient the gases free of acid pass into the air.

The top 21 of the tank is also formed of wood, set into rabbets 22 in the top of the side walls. This top is provided with a manhole to allow entrance into the interior of the tank, said manhole being closed by means of a suitable wooden cover 23. Upon the top of the tank are located distributers 25 for the water, to distribute the water in small streams over the entire area of coke contained in the chamber, As shown, there are four such distributers 25, each of which contains a suitable number of outlets 26 from which the small pipes 27 extend down into the tower. The distributers are supplied with water through a pipe 28 from a suitable elevated reservoir, not shown. Inasmuch as such distributers are well known, they are not illustrated in detail, and need not be further described. Any arrangement or means for distributing the water uniformly over the entire area of charcoal will suffice.

The entire tower is constructed of wood, and in order to protect this from the action of the acid, it is specially treated, first by means of a light thin paint, such as a solution of gilsonite in benzin or gasolene which will penetrate deeply into the wood, and then with a heavy surface coating paint, such as asphaltum paint, which forms an unbroken impervious acid-resisting coating on the wood.

The tower, obviously, can be varied as to its details of construction, or can be built of brick or of concrete, without departing from the spirit of the invention or the terms of the claims hereinafter made.

What I claim is:—

1. A condenser or absorber for hydrofluosilicic acid comprising a closed chamber or tower having a gas inlet at its bottom and a gas outlet at its top, a perforated bottom in said chamber or tower above the gas inlet, the walls of said chamber and said perforated bottom being constructed of wood treated with an acid resisting coating, a charcoal filling upon said perforated bottom, and means for trickling water on to said charcoal.

2. A condenser or absorber for hydrofluosilicic acid, comprising a closed chamber or tower having a gas inlet at its bottom and a gas outlet at its top, a perforated bottom in said chamber above the gas inlet, the walls of said chamber and said bottom being formed of wood treated with a penetrating paint and with a heavy surface coating paint, broken charcoal supported on said perforated bottom, and water distributing and supply means on the top of said tower.

3. A condenser or absorber for hydrofluosilicic acid, comprising a closed chamber or tower having a gas inlet at its bottom and a gas outlet at its top, a perforated bottom in said chamber above the gas inlet, the walls of said chamber and said bottom being formed of wood treated with an acid resisting coating, a filling of broken acid resisting material upon said bottom, and means for trickling water on to said filling.

In testimony whereof I have hereunto set my hand.

KARL F. STAHL.

Witness:
G. H. LERESCHE.